(12) United States Patent
Eulenbach et al.

(10) Patent No.: US 6,988,718 B1
(45) Date of Patent: Jan. 24, 2006

(54) SPRING STRUT, OPTIONALLY WITH INTERNAL LEVEL REGULATION

(75) Inventors: Hans-Dieter Eulenbach, Eitorf (DE); Hubert Beck, Eitorf (DE); Albrecht Nachtigall, Eitorf (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/616,715

(22) Filed: Jul. 14, 2000

(30) Foreign Application Priority Data

Jul. 14, 1999 (DE) ................................ 199 32 868

(51) Int. Cl.
*B60G 15/02* (2006.01)

(52) U.S. Cl. ................ 267/33; 188/321.11; 267/220; 267/221; 267/286; 280/124.155

(58) Field of Classification Search ......... 280/124.155, 280/124.147, 124.146, 124.179, 124.151; 267/220, 221, 33, 166–179, 286–294; 188/321.11; 384/203; 403/133, 76
See application file for complete search history.

(56) References Cited

U.S. PATENT DOCUMENTS

| | | | | |
|---|---|---|---|---|
| 2,290,923 A | * | 7/1942 | Wahlberg | 280/96.2 |
| 3,037,763 A | * | 6/1962 | Steinhagen | 267/34 |
| 3,037,787 A | * | 6/1962 | Gottschald | 280/96.2 |
| 3,573,880 A | * | 4/1971 | Sakai | 280/96.2 |
| 3,781,033 A | * | 12/1973 | Buchwald | 280/124 R |
| 3,940,161 A | * | 2/1976 | Allison | 280/124.108 |
| 4,084,837 A | * | 4/1978 | Milner | 280/668 |
| 4,105,222 A | * | 8/1978 | Buchwald | 280/124.104 |
| 4,175,770 A | * | 11/1979 | Draisbach et al. | 280/668 |
| 4,248,454 A | * | 2/1981 | Cotter et al. | 280/668 |
| 4,260,176 A | * | 4/1981 | Pacis et al. | 280/668 |
| 4,260,177 A | * | 4/1981 | Pflughaupt et al. | 280/668 |
| 4,274,655 A | * | 6/1981 | Lederman | 280/668 |
| 4,332,397 A | * | 6/1982 | Steger | 280/124.155 |
| 4,477,061 A | * | 10/1984 | Kawaura et al. | 267/8 R |
| 4,497,523 A | * | 2/1985 | Lederman | 384/613 |
| 4,552,467 A | * | 11/1985 | Takei et al. | 384/615 |
| 4,673,192 A | * | 6/1987 | Krehan et al. | 280/668 |
| 4,779,855 A | | 10/1988 | Tanaka | |
| 4,798,370 A | * | 1/1989 | Inuzuka | 267/220 |
| 4,903,985 A | * | 2/1990 | Muhr et al. | 280/724 |
| 4,971,296 A | * | 11/1990 | Kondo | 267/220 |
| 4,981,287 A | * | 1/1991 | Cothenet | 267/292 |
| 5,205,545 A | * | 4/1993 | Quast | 267/140.13 |
| 5,213,436 A | * | 5/1993 | Fichtner et al. | 403/220 |
| 5,263,694 A | * | 11/1993 | Smith et al. | 267/220 |
| 5,275,389 A | * | 1/1994 | Pinch et al. | 267/220 |
| 5,308,048 A | * | 5/1994 | Weaver et al. | 267/220 |
| 5,467,971 A | * | 11/1995 | Hurtubise et al. | 267/220 |
| 5,678,844 A | * | 10/1997 | Dassler et al. | 280/668 |
| 6,007,061 A | * | 12/1999 | Kammel et al. | 267/220 |

(Continued)

FOREIGN PATENT DOCUMENTS

DE     1 430 586     3/1969

(Continued)

*Primary Examiner*—Douglas C. Butler
(74) *Attorney, Agent, or Firm*—Cohen, Pontani, Lieberman & Pavane

(57) ABSTRACT

A wheel-guiding spring strut, optionally with internal level regulation, including a shock strut, optionally constructed as a self-pumping hydropneumatic spring strut, a piston rod supported at an upper supporting bearing, and a coil spring which is fixed between the spring strut and the supporting bearing at a spring plate. The spring plate that cooperates with the end of the piston rod is arranged so as to be cardanically movable relative to the piston rod.

16 Claims, 7 Drawing Sheets

U.S. PATENT DOCUMENTS

| | | | |
|---|---|---|---|
| 6,079,700 A | * 6/2000 | Solomond et al. | 267/221 |
| 6,082,749 A | * 7/2000 | Smith et al. | 280/124.155 |
| 6,155,544 A | * 12/2000 | Solomond et al. | 267/220 |
| 6,247,688 B1 | * 6/2001 | De Fontanay et al. | 267/220 |
| 6,260,835 B1 | * 7/2001 | Angles et al. | 188/321.11 |
| 2002/0171223 A1 | * 11/2002 | Chan | 280/124.179 |

FOREIGN PATENT DOCUMENTS

| | | | |
|---|---|---|---|
| DE | 2242442 | * | 3/1974 |
| DE | 2705321 | * | 8/1978 |
| DE | 2852655 | * | 4/1980 |
| DE | 36 30 757 | | 3/1988 |
| DE | 38 01 167 | | 8/1988 |
| DE | 38 27 760 | | 3/1989 |
| DE | 4010858 | * | 10/1991 |
| DE | 197 48 634 | | 5/1998 |
| DE | 19932868 | * | 1/2001 |
| EP | 187970 | * | 7/1986 |
| EP | 602330 | * | 6/1994 |
| FR | 1424208 | | 3/1966 |
| FR | 2658129 | * | 8/1991 |
| FR | 2796888 | * | 2/2001 |
| GB | 1102492 | | 2/1968 |
| GB | 2 040 353 A | | 8/1980 |

* cited by examiner

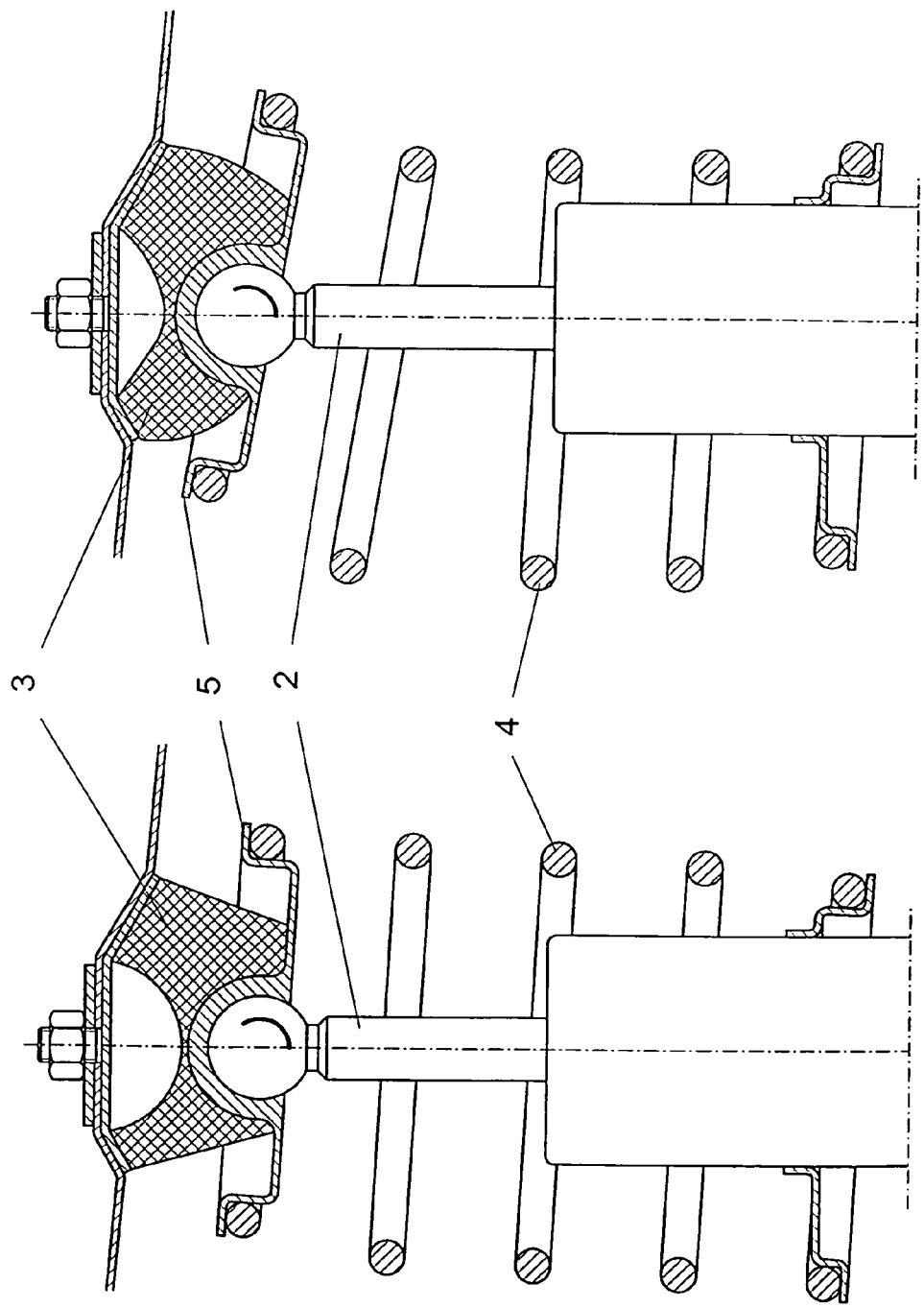

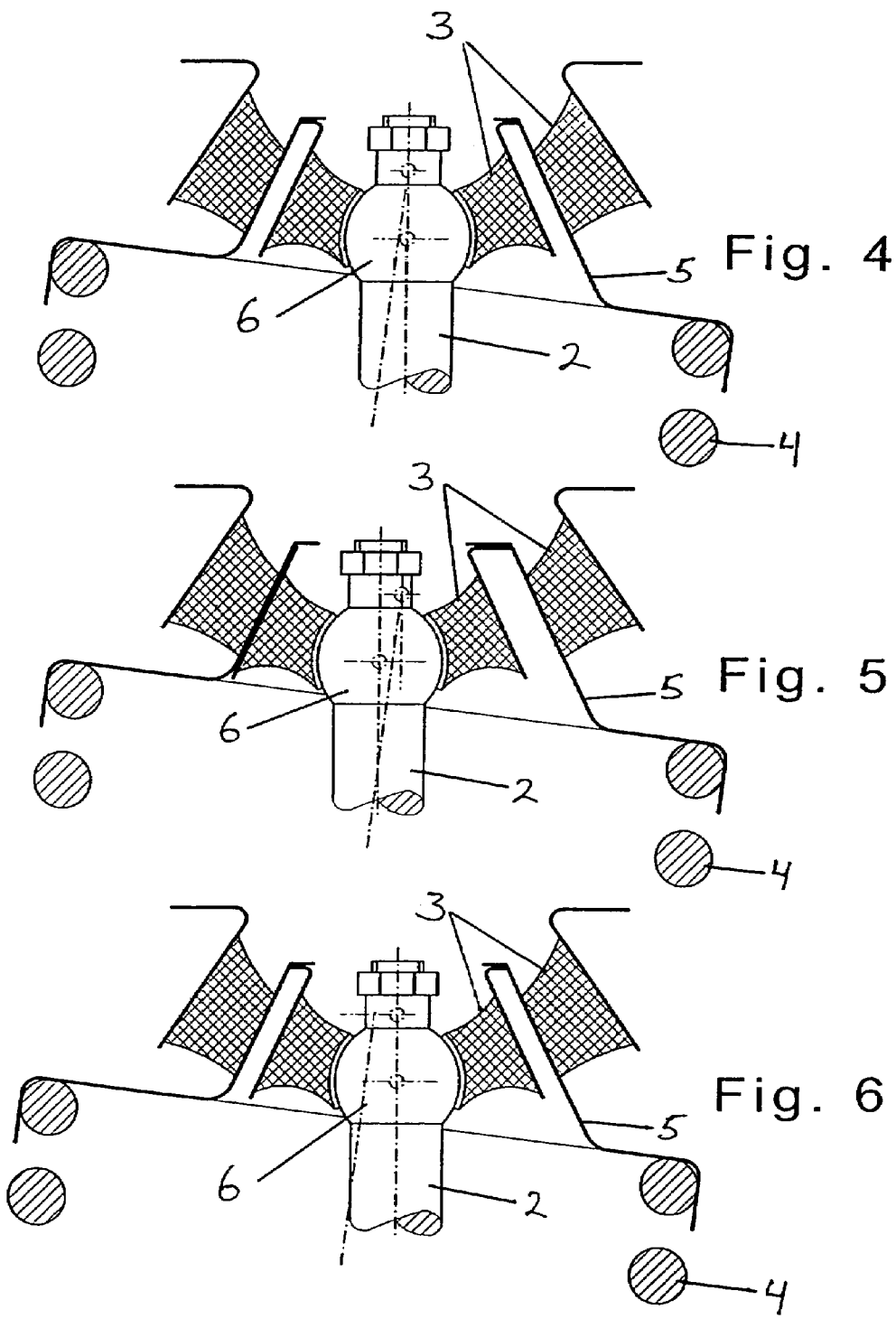

Triangle of forces

Triangle of forces

SPRING STRUT, OPTIONALLY WITH INTERNAL LEVEL REGULATION

BACKGROUND OF THE INVENTION

1. Field of the Invention

The invention relates to a wheel-guiding spring strut, optionally with internal ride-height control or level regulation, comprising a shock strut optionally constructed as a self-pumping hydropneumatic spring strut, a piston rod supported at an upper supporting bearing, and a coil spring which is fixed between the spring strut and the supporting bearing at a spring plate.

2. Discussion of the Prior Art

In known wheel-guiding spring struts with integrated level regulation and a mechanical auxiliary spring (see German reference DE 36 30 757 C2), the differences in position caused by load are compensated by the change in the hydropneumatic spring forces acting along the piston rod, so that the carrying part of the mechanical auxiliary spring remains practically unchanged. However, this also impairs the compensation of transverse force effected via the mechanical auxiliary spring; namely, when load is increased relative to the fully compensated design state, this leads to an undercompensation, while a decreased load leads to overcompensation.

Further, wheel-guiding spring struts are known, wherein increased lateral forces due to the bending moment to be supported occur in the piston rod guide and at the damping piston. These increased lateral forces generate uncomfortable friction forces in the suspension movements of the spring strut. Such a disadvantage is compensated by a balancing or compensation of transverse forces (e.g., German reference DE 14 30 586 A1). In this case, the coil spring is installed so as to be partially transversely clamped in order to achieve a spring force extending obliquely relative to the damper axis. However, this compensation is carried out only in a determined preferred position, usually in the so-called design position, so that a complete compensation of the bending moment, and therefore of the lateral forces, takes place only in this design position. The compensation effect is accordingly load-dependent and position-dependant, so that the compensating action does not take effect outside of the design position. The eccentric offset of the spring plate or transversely-clamped installation of the spring is meant to influence the spring force direction and spring force position so that the bending moment on the spring strut resulting from the wheel support with the known disadvantageous consequences, i.e., lateral forces, friction and wear on the linkage and piston, is completely or partially compensated in the normal position of the vehicle.

SUMMARY OF THE INVENTION

Accordingly, it is an object of the present invention to provide a spring strut with internal level regulation which compensates for transverse forces in an optimal manner in different load states.

According to the invention, this object is met in wheel-guiding spring struts with internal level regulation in that the spring plate cooperating with the end of the piston rod is arranged so as to be movable in the manner of a cardan joint relative to the piston rod.

In this respect, it is advantageous that the response to the changing extending force of the piston rod during loading and unloading of the vehicle consists in a change in the cardanic adjusting angle of the spring plate so that the spring plate contact axis extends flatter during an increase in force and its point of intersection with the ground wanders outward. As a result, a cardanic moment acts on the upper end of the coil spring which affects the compensation in the desired, positive sense.

In order to solve this problem, it is provided in wheel-guiding spring struts, according to the invention, that the spring plate cooperating with the end of the piston rod is arranged so as to be movable cardanically relative to the piston rod.

In order to overcome the disadvantages mentioned previously, it is suggested that the upper and lower spring plate, or both, are supported so as to be cardanically movable relative to the spring strut and that this bearing arrangement is designed so that a cardanic deflection of the spring plate, or spring plates, is caused when the spring force increases. This results in a cardanic moment on the ends of the springs and a rotation of the working axis of the spring in the direction of the aforementioned requirements to the degree necessary to maintain the transverse force compensation at the spring strut.

This bearing behavior can be achieved by the same means as those used in the level regulation.

Accordingly, this differs from the level regulating solution in that the spring force itself, and not the piston extending force (not statically present), actuates and controls the bearing cardanic mechanism.

In the case of the lower spring bearing, the cardanic deflection must be carried out in the same rotating direction as above, so that, for example, when steps are carried out on both sides, an S-deformation of the spring occurs.

Further, in order to achieve cardanic movability, the supporting bearing is constructed asymmetrically, wherein the piston rod and/or the coil spring acts centrically on the supporting bearing, or the supporting bearing is constructed symmetrically, wherein the piston rod and/or the coil spring acts eccentrically on the supporting bearing, or the supporting bearing is constructed symmetrically, wherein a cardanic deformation is carried out during axial loading by the piston rod and/or coil spring, or a combination thereof.

According to another embodiment, the end of the piston rod is constructed so as to be at least partially spherical.

In still another embodiment, the spring plate has an at least partially spherical supporting surface which cooperates with the end region of the piston rod.

In another possibility for cardanic movability, the spring plate is supported at an elastic part of the supporting bearing.

According to another embodiment, the coil spring is arranged asymmetrically over the spring plate at the spring strut with respect to the center axis of the spring strut.

It is provided further that the coil spring is deformed asymmetrically under loading or that the spring plate is moved via an externally fed arrangement.

In this case, it is advantageous that the desired supporting bearing behavior can be achieved by means of a corresponding asymmetrical configuration, but also by means of an asymmetrical deformation behavior due, for instance, to included supporting elements or reinforcing elements or also by means of a combination of both or by means of different elastic material characteristics (Shore hardness values) of the supporting bearing. Further, a supporting bearing of this type would also considerably reduce the reaction of the dynamic damping forces on the friction, so that a bearing of this kind is also suitable for conventional spring struts.

It is further advantageous that a supporting bearing of this kind is outfitted with an externally fed reinforcement, so that the piston rod extending force exerts a cardanic moment on the spring plate directly via this device or via the supporting bearing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 2 and 3 show an upper supporting bearing together with the spring plate in enlarged scale;

FIGS. 4, 5 and 6 show a schematic system of the supporting bearing;

DETAILED DESCRIPTION OF THE PREFERRED EMBODIMENTS

Figure 1:
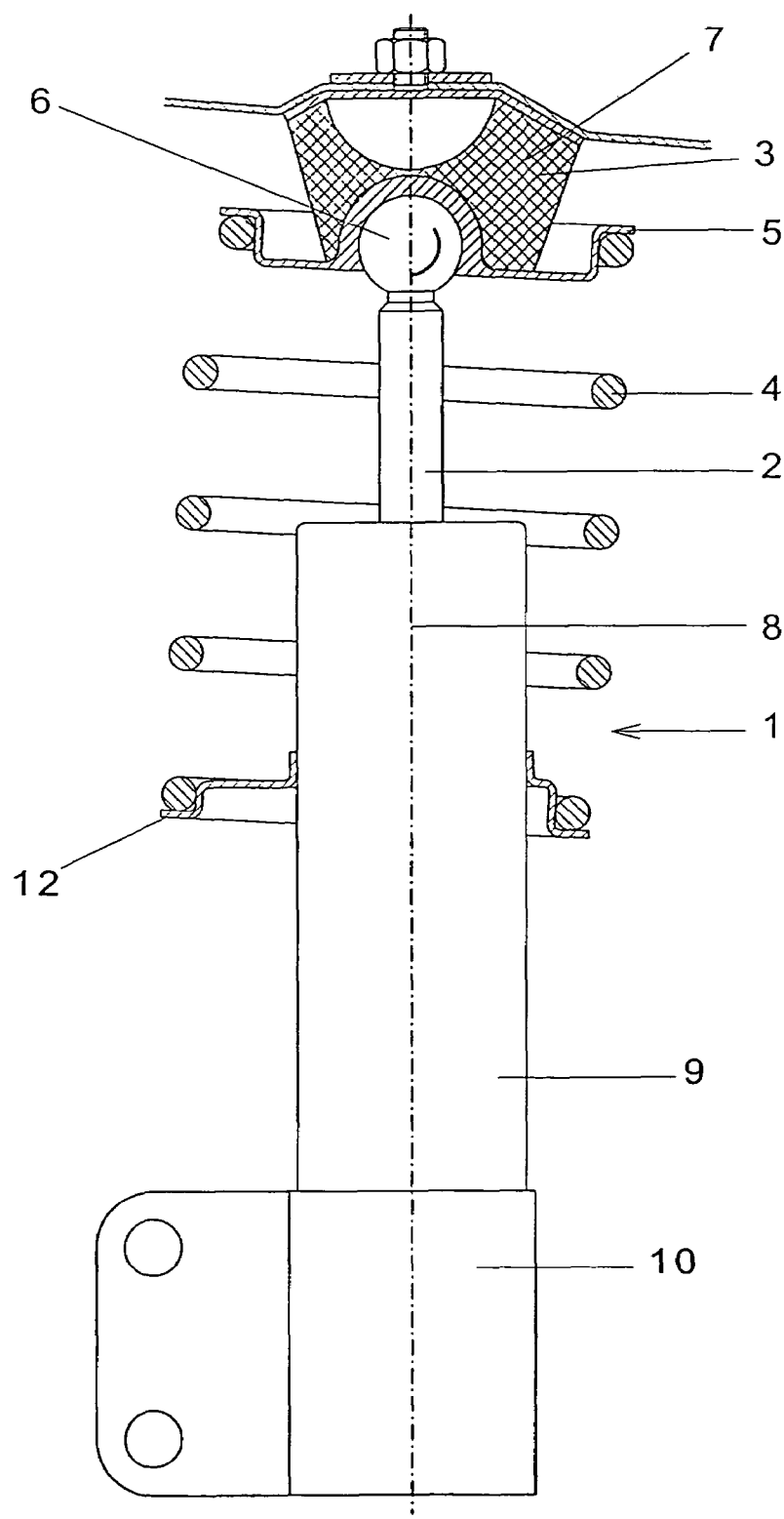
FIG. 1 is a plan view showing a spring strut with internal level regulation pursuant to the present invention.

FIG. 1 essentially shows a spring strut 1 which is formed of a housing 9, a fastening element 10 for fastening to the wheel suspension, a piston rod 2, a supporting bearing 3, a coil spring 4, a spring plate 5 and a lower spring plate 12.

The upper end of the piston rod 2 is provided with a supporting surface 6 which is at least partially spherical and is even shown as completely spherical in this embodiment, so that the supporting surface 6 can execute a cardanic movement relative to the spring plate 5. The center axis 8 of the spring strut 1 diverges from the center axis of the coil spring 4. The center axis of the coil spring 4 changes when the spring strut 1 is loaded in that the spherical supporting surface 6 occupies a changed position relative to the spring plate 5. The elastic part 7 of the supporting bearing 3 is deformable, so that the supporting bearing 3 can follow the movements of the spring plate 5.

FIGS. 2 and 3 show the supporting bearing 3, the spring plate 5, the coil spring 4 and the piston rod 2 in an enlarged scale. It will be seen from FIG. 3 in relation to FIG. 2 that the spring plate 5 can carry out a cardanic movement when the load on the spring strut 1 increases, so that the coil spring 4 responds with a corresponding deformation. This leads to a change in the center axis of the coil spring 4, so that the imaginary elongation of the center axis of the coil spring 4 on the ground is shifted outward.

FIG. 4 shows a two-part supporting bearing in which the piston rod 2 is supported cardanically in an articulated manner in the inner part, and this inner part, together with the spring plate 5, is supported at the outer part. The cardanic elasticity of the inner part is not significant within the context of the invention, but that of the outer part is critically important.

This bearing has two cardanic points of rotation; the lower is the point of rotation of the piston rod in the inner part, the upper is the point of rotation of the outer part. These two points of rotation are design-dependent and may also coincide if required.

Since this bearing is constructed symmetrically and is provided with a centrically acting piston rod and spring on the respective associated cardanic point of rotation, the function according to the invention can be achieved only by means of an asymmetric cardanic deformation behavior which is not shown in the drawing, wherein the forces exerted by the piston rod and by the spring have the same action on the cardanic mechanism.

Accordingly, it is not possible to differentiate between the two in this respect.

FIG. 5 shows the same bearing, but with an eccentric offsetting of the inner bearing and its piston rod support, which can clearly be seen. Due to the eccentricity, it is possible to differentiate between the piston rod and the spring with respect to the cardanic action.

When there is full symmetry of the outer part with respect to design and deformation behavior, this bearing would only compensate for the hydropneumatic spring forces and damping forces exerted by the piston rod.

FIG. 6 shows the same bearing as in FIG. 4, but with a clearly recognizable eccentric offset of the spring plate and the spring. Due to the eccentricity, it is possible to differentiate between the piston rod and the spring with respect to the cardanic action.

When there is full symmetry of the outer part with respect to design and deformation behavior, this bearing would only compensate for the forces exerted by the spring in the rest position as well as when springing.

Figures 7, 7A:
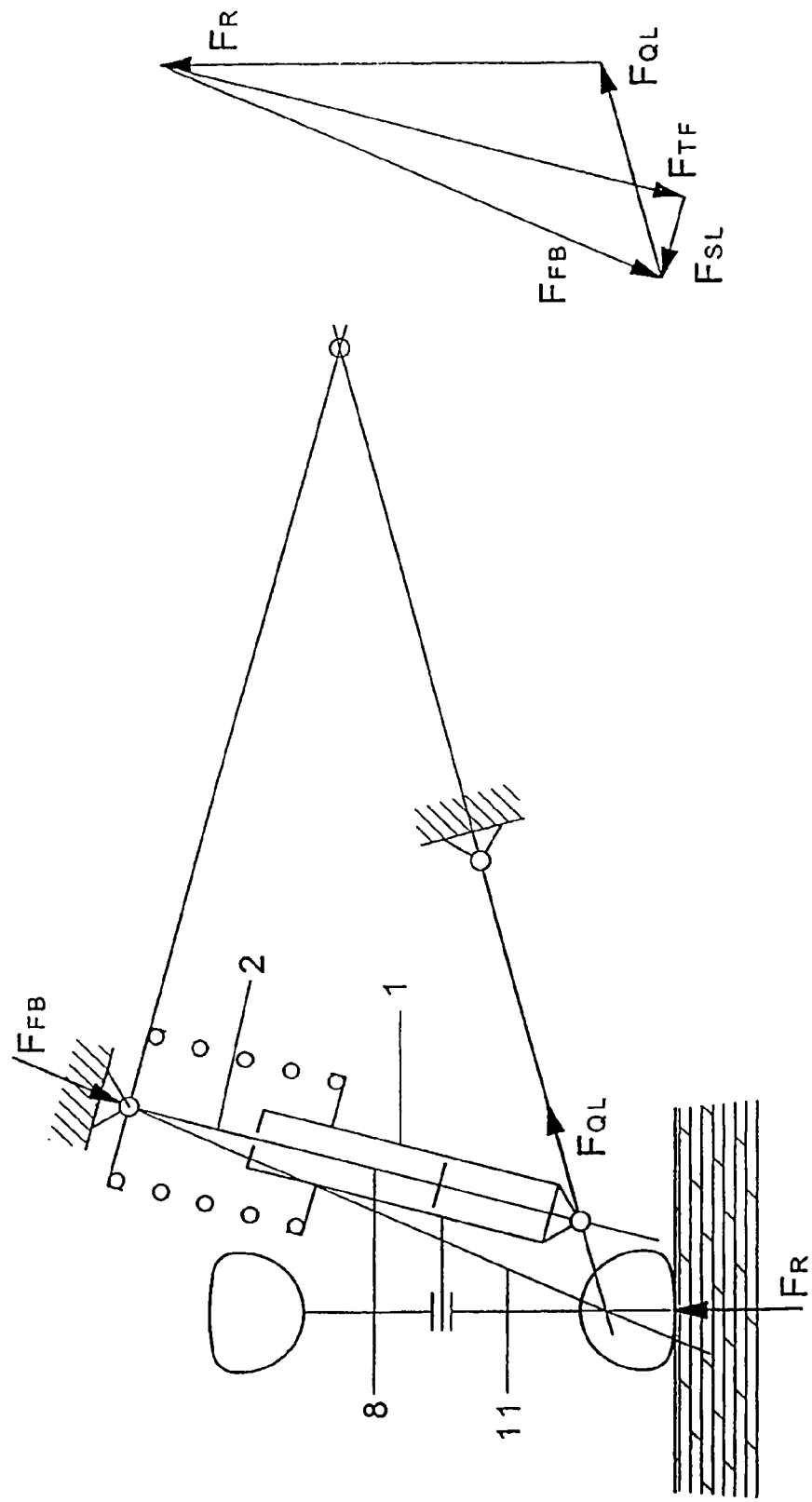
FIGS. 7 and 7a show a schematic view of the statics of a spring strut axis of a conventional spring strut according to the prior art.

FIG. 7 shows the kinematics and statics of a spring strut axis as prior art, wherein $F_R$ is the wheel contact force, $F_{QL}$ is the control arm force, and $F_{FB}$ is the spring strut force in the upper supporting bearing. This gives a triangle of forces as shown in FIG. 7a. Due to the fact that the center axis 8 of the spring strut 1 does not coincide with the working line 11 of the spring strut supporting force, a lateral force results on the piston rod 2. The aim is to compensate for this lateral force, specifically, in a spring strut with internal level regulation in all load states.

Figure 8:
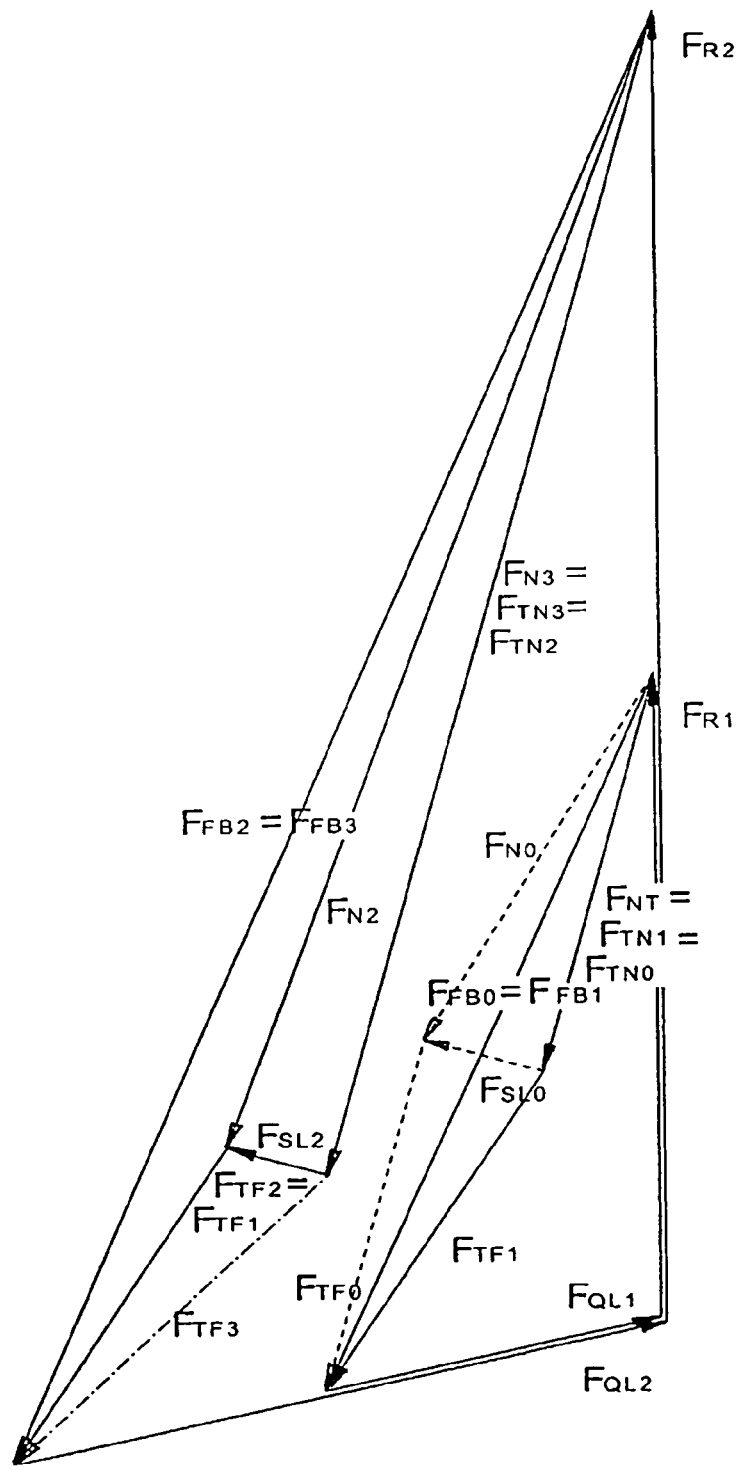
FIG. 8 shows a triangle of forces and static design of a spring strut according to the invention with internal level regulation.

FIG. 8 shows a triangle of forces of a spring strut with internal level regulation, wherein the reference numbers employed are shown in the following key.

The right-hand portion of this triangle of forces with index 1 represents the state of the spring strut in the base load in which the lateral force on the piston rod is fully compensated by a corresponding arrangement and/or design of the spring with respect to its force $F_{TF1}$.

If the spring acted coaxial to the spring strut, the spring force $F_{TF0}$ and hydropneumatic carrying component $F_{TN0}$ would be identically directed, which would bring about an unwanted lateral force $F_{SL0}$ on the piston rod due to the equilibrium.

With an increase in load, the triangle of forces with index 2 on the left-hand side, similar to the triangle of forces on the right-hand side, takes effect after the level position is regulated. The carrying component of the mechanical auxiliary spring remains equal ($F_{TF2}=F_{TF1}$) and the load increase is absorbed only by means of an increase in the hydropneumatic carrying component ($F_{TN2}>F_{TN1}$) and a lateral force $F_{SL2}$ occurring on the piston rod in addition.

Due to the cardanic adjustment of the spring plate according to the invention which is caused by the increased piston rod extending force $F_{TN2}$, the spring force changes from $F_{TF2}$ to $F_{TF3}$, so that the unwanted lateral force $F_{SL2}$ is made to disappear completely.

Key
$F_R$=wheel contact force
$F_{QL}$=control arm force
$F_{FB}$=entire spring strut force in the upper supporting bearing
$F_N$=entire (leveling) telescoping force of the spring strut in the upper supporting bearing (acts on piston rod)
$F_{TN}$=hydropneumatic carrying component of the spring strut
$F_{SL}$=lateral force on piston rod in the upper supporting bearing
$F^{TF}$=carrying force of the mechanical auxiliary spring Indices
0=base load not compensated
1=base load fully compensated by offset auxiliary spring
2=load with compensation on base 1
3=load fully compensated by reinforced offset by means of cardanic supporting bearing readjustment Equations $$\vec{F}_R + \vec{F}_{QL} + \vec{F}_{FB} = 0$$

$$\vec{F}_N = \vec{F}_{TN} + \vec{F}_{SL}$$

$$\vec{F}_{FB} = \vec{F}_{TF} + \vec{F}_N = \vec{F}_{TF} + \vec{F}_{TN} + \vec{F}_{SL}$$

Figure 9A:
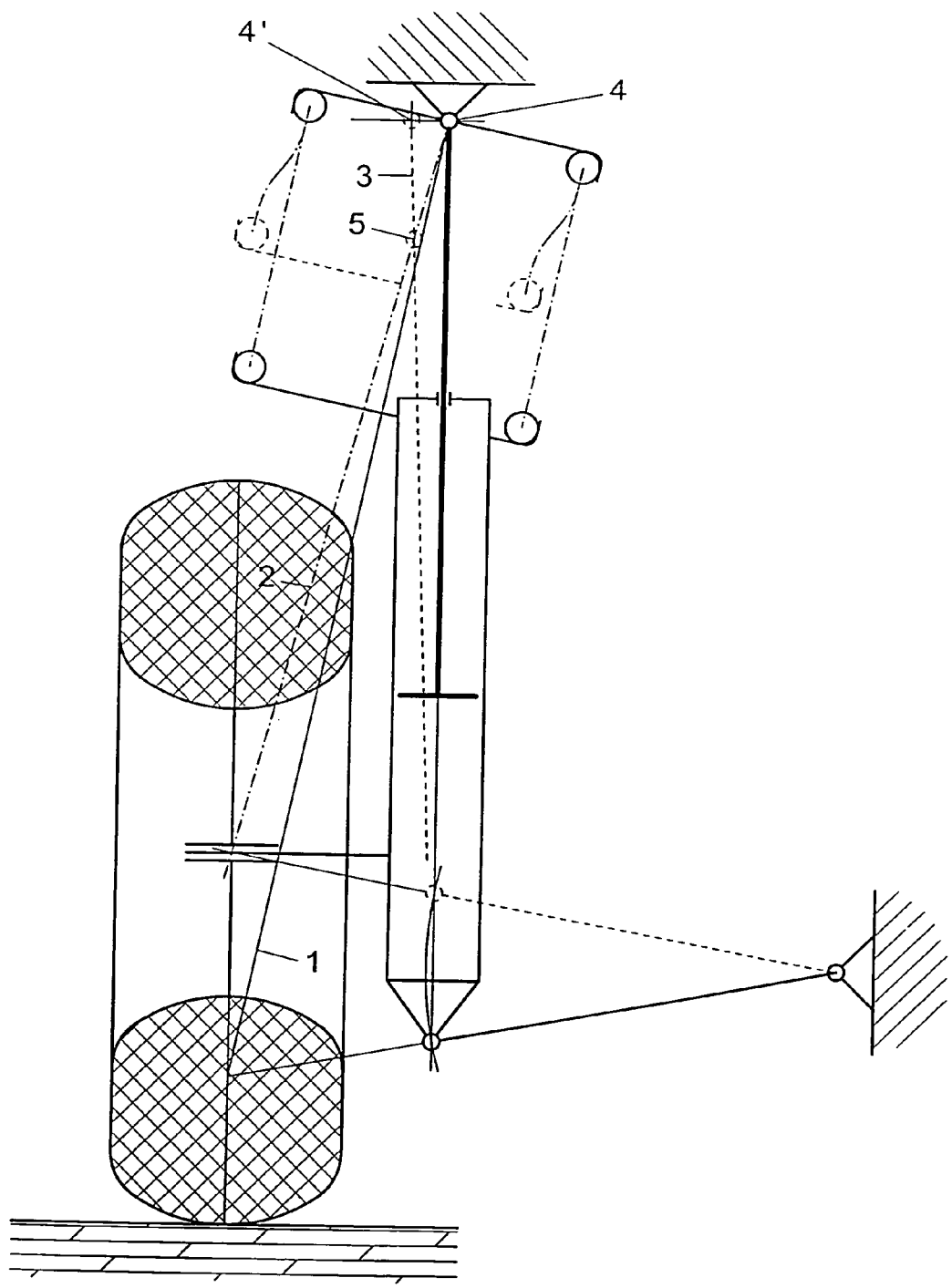
FIGS. 9a and 9b show a triangle of forces and static design of a spring strut.
Figure 9B:
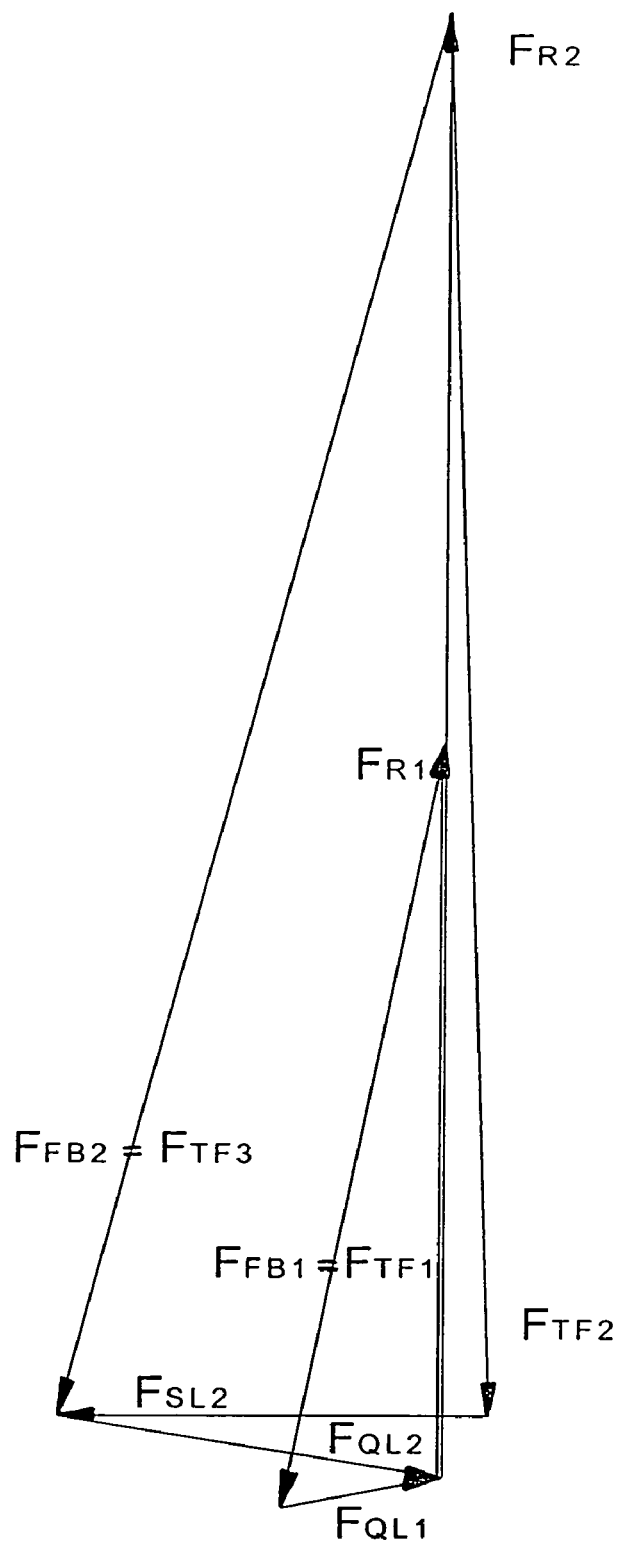

FIG. 9b shows a triangle of forces of a wheel-guiding spring strut FIG. 9a without internal level regulation, wherein the designations used are shown in the following key.

The right-hand portion of this triangle of forces with indices 1 represents the state of the spring strut with base load in the rest position in which the lateral force on the piston rod is fully compensated by corresponding steps analogous to FIG. 8.

During loading or inward deflection of the spring, both the magnitude of force and the position of the axle guiding members change relative to one another; this is shown in the left-hand part of the triangle of forces with index 2. It can be seen that, in order to maintain compensation, the spring force would have to change its direction in such a way that its force intersection point on the ground wanders outward.

In fact, the spring force $F_{TF2}$ rotates in the opposite direction due to the occurring transverse suspension component, which additionally reinforces the lateral force $F_{SL2}$ on the piston rod brought about by equilibrium.

In case of a separate support of the spring at the body, the outer force center 4' of the upper support located at the intersection of the spring force and lateral force on the piston rod shifts outward, which somewhat reduces the increase in lateral force, but does not eliminate it.

With a fixedly connected support of the spring and the piston rod on the body, the undiminished lateral force occurs, but the inner force center 5 of the piston rod located at the intersection of spring force and resultant bearing force shifts downward, which causes a reduction in the effective lever and the resultant inner supporting forces in the linkage and at the piston. intersection of spring force and resultant bearing force shifts downward, which causes a reduction in the effective lever and the resultant inner supporting forces in the linkage and at the piston.

By means of the cardanic adjustment of the spring plate according to the invention which is caused by the increased spring force $F_{TF2}$, the spring force changes from $F_{TF2}$ to $F_{TF3}$, so that the unwanted lateral force $F_{SL2}$ is made to completely disappear.

Key to FIG. 9a
1=force axis normal position fully compensated
2=force axis inward deflection fully compensated (reference)
3=force axis real inward deflection from spring (actual)
4=external force center of upper supporting bearing normal position and inward deflection with fixedly connected spring plate
4'=external force center of upper support bearing inward deflection with separate spring plate
5=inner force center of piston rod inward deflection with fixedly connected spring plate Key to FIG. 9b
$F_R$=wheel contact force
$F_{QL}$=control arm force
$F_{FB}$=separate spring strut force in upper supporting bearing
$F_{SL}$=lateral force on piston rod in the upper supporting bearing
$F_{TF}$=resultant carrying spring force Indices
1=normal position fully compensated by offset carrying spring
2=inward deflection or loaded
3=full compensation of 2 by cardanic readjustment of the spring plate Equations $$\vec{F}_R + \vec{F}_{QL} + \vec{F}_{FB} = 0$$

$$\vec{F}_{FB} = \vec{F}_{TF} + \vec{F}_{SL}$$

The invention is not limited by the embodiments described above which are presented as examples only but can be modified in various ways within the scope of protection defined by the appended patent claims.

What is claimed is:

1. A wheel-guiding spring strut with internal level regulation connectable between upper and lower support structures, comprising:
    a self-pumping hydropneumatic spring strut having a piston rod;
    an upper supporting bearing connectable to the upper support structure and dimensioned and arranged for supporting an upper end of the piston rod of the spring strut relative to the upper support structure, the piston rod being cardanically movable relative to the upper supporting bearing;
    a spring plate fixed to a surface of the upper supporting bearing and having a center axis normal to a plane of the spring plate, the spring plate being arranged so as to be cardanically movable relative to the piston rod; and
    a coil spring fixed between the spring strut and the supporting bearing at the spring plate, the supporting bearing being asymmetrically deformable in response to axial loading by at least one of the piston rod and the coil spring such that the center axis of the spring plate pivots outward relative to a longitudinal axis of the piston rod and the surface of the upper support bearing follows the pivoting movement of the spring plate.

2. A spring strut according to claim 1, wherein the supporting bearing is constructed asymmetrically, at least one of the piston rod and the coil spring being arranged to act centrically on the supporting bearing.

3. A spring strut according to claim 1, wherein the supporting bearing is constructed symmetrically, at least one of the piston rod and the coil spring being arranged to act eccentrically on the supporting bearing.

4. A spring strut according to claim 1, wherein the piston rod has an end constructed so as to be at least partially spherical.

5. A spring strut according to claim 1, wherein the spring plate has an at least partially spherical supporting surface which cooperates with an end region of the piston rod.

6. A spring strut according to claim 1, wherein the supporting bearing has an elastic part, the spring plate being supported at the elastic part of the supporting bearing.

7. A spring strut according to claim 1, wherein the coil spring is arranged asymmetrically over the spring plate at the spring strut with respect to a center axis of the spring strut.

8. A spring strut according to claim 1, wherein the coil spring is asymmetrically deformable under load.

9. Wheel-guiding spring strut connectable between upper and lower support structures, comprising:
   a housing;
   a piston rod axially movably arranged in said housing;
   an upper supporting bearing connectable to the upper support structure and dimensioned and arranged for supporting an upper end of the piston rod of said spring strut relative to the upper support structure, the piston rod being cardanically movable relative to the upper supporting bearing;
   a spring plate fixed to a surface of the upper supporting bearing and having a center axis normal to a plane of the spring plate, the spring plate being arranged so as to be cardanically movable relative to the piston rod; and
   a coil spring fixed between the housing and the supporting bearing at the spring plate, the supporting bearing being asymmetrically deformable in response to axial loading by at least one of the piston rod and the coil spring such that the center axis of the spring plate pivots outward relative to a longitudinal axis of the piston rod and the surface of the upper support bearing follows the pivoting movement of the spring plate.

10. A spring strut according to claim 9, wherein the supporting bearing is constructed asymmetrically, at least one of the piston rod and the coil spring being arranged to act centrically on the supporting bearing.

11. A spring strut according to claim 9, wherein the supporting bearing is constructed symmetrically, at least one of the piston rod and the coil spring being arranged to act eccentrically on the supporting bearing.

12. A spring strut according to claim 9, wherein the piston rod has an end constructed so as to be at least partially spherical.

13. A spring strut according to claim 9, wherein the spring plate has an at least partially spherical supporting surface which cooperates with an end region of the piston rod.

14. A spring strut according to claim 9, wherein the supporting bearing has an elastic part, the spring plate being supported at the elastic part of the supporting bearing.

15. A spring strut according to claim 9, wherein the coil spring is arranged asymmetrically over the spring plate at the spring strut with respect to a center axis of the spring strut.

16. A spring strut according to claim 9, wherein the coil spring is asymmetrically deformable under load.

\* \* \* \* \*